United States Patent
Kim et al.

(10) Patent No.: US 11,556,674 B2
(45) Date of Patent: Jan. 17, 2023

(54) SYNCHRONIZATION CIRCUIT FOR THRESHOLD IMPLEMENTATION OF S-BOX

(71) Applicants: AGENCY FOR DEFENSE DEVELOPMENT, Daejeon (KR); Korea University Research and Business Foundation, Seoul (KR)

(72) Inventors: Bohun Kim, Seoul (KR); Jongsun Park, Seoul (KR); Donghwa Kim, Daejeon (KR); Myungkil Ahn, Daejeon (KR)

(73) Assignees: AGENCY FOR DEFENSE DEVELOPMENT, Daejeon (KR); Korea University Research and Business Foundation, Seoul (KR)

( * ) Notice: Subject to any disclaimer, the term of this patent is extended or adjusted under 35 U.S.C. 154(b) by 126 days.

(21) Appl. No.: 17/202,905

(22) Filed: Mar. 16, 2021

(65) Prior Publication Data

US 2021/0286903 A1    Sep. 16, 2021

(30) Foreign Application Priority Data

Mar. 16, 2020   (KR) .......................... 10-2020-0032097

(51) Int. Cl.
  *G06F 21/72*   (2013.01)
  *H03K 19/21*   (2006.01)
  (Continued)

(52) U.S. Cl.
  CPC .............. *G06F 21/72* (2013.01); *H03K 3/037* (2013.01); *H03K 19/21* (2013.01); *H04L 9/003* (2013.01);
  (Continued)

(58) Field of Classification Search
  CPC ....................................................... G06F 21/72
  See application file for complete search history.

(56) References Cited

U.S. PATENT DOCUMENTS

| | | | | |
|---|---|---|---|---|
| 2007/0001734 A1* | 1/2007 | Onouchi | ................ | H03K 3/012 327/218 |
| 2011/0285420 A1* | 11/2011 | Deas | ....................... | H04L 9/003 326/8 |

(Continued)

FOREIGN PATENT DOCUMENTS

| | | |
|---|---|---|
| KR | 10-2009-0074969 A | 7/2009 |
| KR | 10-2012-0012119 A | 2/2012 |
| KR | 10-2016-0039011 A | 4/2016 |

*Primary Examiner* — Simon P Kanaan
(74) *Attorney, Agent, or Firm* — Knobbe, Martens, Olson & Bear, LLP

(57) ABSTRACT

This application relates to a synchronization circuit for synchronizing signals used in a threshold implementation operation process performing in an S-box of an encryption circuit. In one aspect, the synchronization circuit includes an enable signal generator configured to generate an enable signal. The synchronization circuit may also include a synchronization unit included in an encryption circuit and located inside an S-box that performs a threshold implementation operation that calculates by dividing bits of an input signal into bits equal to or greater than the number of bits of the input signal. The synchronization unit may be configured to synchronize signals used in a threshold implementation operation process based on the generated enable signal.

5 Claims, 4 Drawing Sheets

(51) Int. Cl.
    *H03K 3/037*    (2006.01)
    *H04L 9/00*     (2022.01)
    *H04L 9/06*     (2006.01)
(52) U.S. Cl.
    CPC ........ *H04L 9/0631* (2013.01); *H04L 2209/04* (2013.01); *H04L 2209/12* (2013.01)

(56) References Cited

U.S. PATENT DOCUMENTS

2013/0222018 A1* 8/2013 Park ................ H03L 7/0802
                                              327/142
2018/0088156 A1* 3/2018 Yamada .......... G01R 19/16566

* cited by examiner

SYNCHRONIZATION CIRCUIT FOR THRESHOLD IMPLEMENTATION OF S-BOX

CROSS-REFERENCE TO RELATED APPLICATION

This application claims priority to Korean Patent Application No. 10-2020-0032097, filed on Mar. 16, 2020. The entire contents of the application on which the priority is based are incorporated herein by reference.

TECHNICAL FIELD

The present disclosure relates to a synchronization circuit for synchronizing signals used in a threshold implementation operation process performing in an S-box of an encryption circuit.

BACKGROUND

In an encryption circuit such as an advanced encryption standard (AES), a malicious attacker may steal sensitive information such as key values.

Particularly, among attackers' attack methods, a side channel attack (SCA) is an attack method of using additional information such as electromagnetic waves or power consumption generated while an algorithm is running without being directly involved in the algorithm, and differential power analysis (DPA) or correlation power analysis (CPA), which analyzes a correlation between input data and power consumption to use the correlation in an attack, is widely used due to a strong attack capability.

SUMMARY

The present disclosure provides a synchronization circuit.

Further, it is possible to synchronize signals used in a threshold implementation operation process performing in an S-box with only a simple circuit configuration, and accordingly, relative reduction of an area, a power consumption amount, and a cost for implementing a synchronization circuit may be included in the problem to be solved of the present disclosure.

In accordance with an aspect of the present disclosure, there is provided a synchronization circuit, The synchronization circuit comprises, an enable signal generator configured to generate an enable signal; and a synchronization unit included in an encryption circuit and located inside an S-box that performs a threshold implementation operation that calculates by dividing bits of an input signal into bits equal to or greater than the number of bits of the input signal, and configured to synchronize signals used in a threshold implementation operation process based on the generated enable signal.

Also the synchronization circuit further comprises an initialization circuit configured to provide an initialization signal to the synchronization unit received the enable signal.

Also the synchronization unit comprises a plurality of AND gates configured to receive a part of the input signal and the enable signal; and a plurality of combinational logic circuit units comprising a first XOR gate configured to receive an output of each of the plurality of AND gates.

Also the enable signal generator comprises a flip-flop configured to receive a clock signal; a first critical path replica circuit configured to receive an output signal of the flip-flop and providing the enable signal to a part of the synchronization unit; and a second critical path replica circuit connected in series with the first critical path replica circuit and configured to provide the enable signal to a synchronization circuit different from a part of the synchronization circuit.

Also the initialization circuit unit comprises a NOT gate configured to receive an output signal of the flip-flop; a second XOR gate configured to receive an output signal of the NOT gate and an output signal of the first critical path replication circuit; and a third XOR gate configured to receive an output signal of the NOT gate and an output signal of the second critical path replica circuit.

Also the synchronization unit comprises a first switch element configured to receive the enable signal to be selectively switched; a pull-up network (PUN) connected in series with the first switch element and configured to receive the input signal; a pull-down network (PDN) connected in series with the PUN and configured to receive the input signal; and a second switch element connected in series with the PUN, connected in parallel with the PDN, and configured to receive the enable signal to be selectively switched.

Because a synchronization circuit according to an embodiment can synchronize signals used in a threshold implementation operation process performing in an S-box using a simple combinational logic circuit or switch element, an area, a power consumption amount, and a cost to implement the synchronization circuit can be relatively reduced.

Further, because the synchronization circuit can perform an operation that takes several clock cycles within one clock cycle, the latency of the operation can be greatly reduced.

Further, by using the synchronization circuit, a glitch phenomenon caused by a difference in delay of a signal that reaches the circuit can be eliminated.

DETAILED DESCRIPTION

As a method of preventing such an attack by attackers, a masking technique has been proposed that removes a correlation between a computational algorithm and an actual computed value by combining an intermediate value with a random value during a computation process.

However, by using power consumption that occurs as a glitch phenomenon occurs due to a difference in delay of a signal that reaches a circuit, there is a problem that power analysis is still possible even for a circuit to which masking is applied.

For this reason, threshold implementation (TI), which is an advanced masking technique, has been proposed to solve a glitch problem, and TI is a technique that divides an input bit into several bits and calculates the several bits, and existing functions are divided into several auxiliary functions and designed.

However, in the S-box that performs a substitution operation that converts an m-bit input to an n-bit output in TI, which is a nonlinear operation used for cryptographic algorithms, when signals are synchronized in each stage in which an AND operation (multiplication operation) is included, information leakage occurring in a glitch phenomenon was able to be prevented.

Advantages and features of the present disclosure, and a method of achieving them will become apparent with reference to embodiments described below in detail together with the accompanying drawings. However, the present disclosure is not limited to the embodiments disclosed below, but may be implemented in various different forms, only these embodiments are intended to complete the disclosure of the present disclosure, and are provided to completely inform the scope of the disclosure to those of common knowledge in the technical field to which the present disclosure pertains, and the present disclosure is only defined by the scope of the claims.

In describing embodiments of the present disclosure, when it is determined that a detailed description of a known function or configuration may unnecessarily obscure the subject matter of the present disclosure, a detailed description thereof will be omitted. Terms to be described later are terms defined in consideration of functions in an embodiment of the present disclosure, which may vary according to the intention or custom of users or operators. Therefore, a definition thereof should be made based on the contents throughout this specification.

Figure 1:
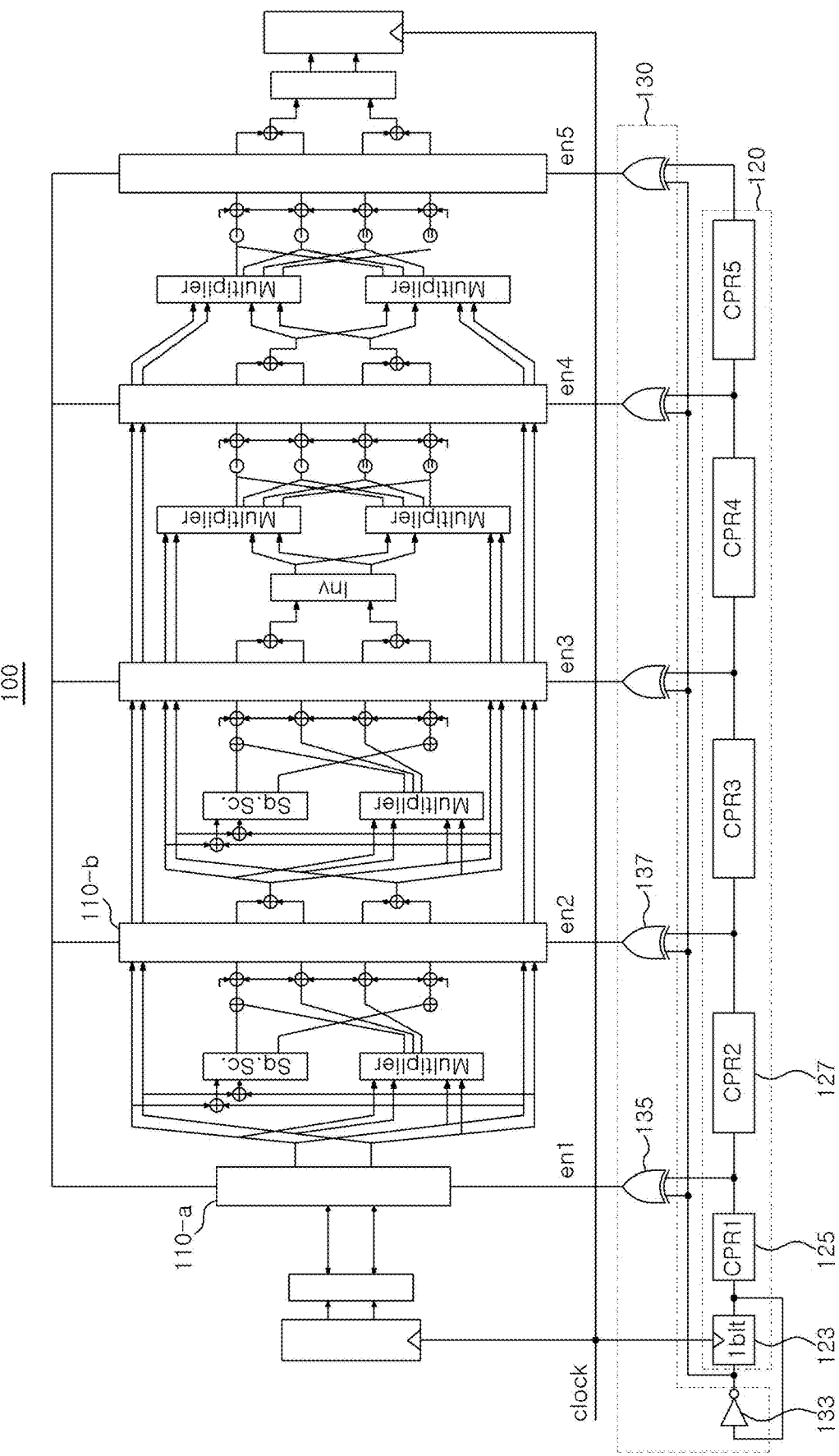
FIG. 1 shows a circuit diagram of a synchronization circuit according to an embodiment of the present disclosure.

FIG. 1 shows a circuit diagram of a synchronization circuit according to an embodiment of the present disclosure.

The synchronization circuit 100 according to an embodiment may be a circuit for synchronizing signals used in a threshold implementation operation process performing in an S-box that performs a threshold implementation operation that calculates by dividing bits of a signal input from an encryption circuit into bits equal to or greater than the number of bits of the input signal, but the present disclosure is not limited thereto.

Referring to FIG. 1, the synchronization circuit 100 according to an embodiment may include a synchronization unit 110, an enable signal generator 120, and an initialization circuit unit 130, but the present disclosure is not limited thereto. Further, each of the components included in the synchronization circuit 100 may be implemented in the form of a software module or a hardware module or the form in which a software module and a hardware module are combined, for example, in a computer or a smart device, and each of the components may be electrically connected.

The synchronization unit 110 may be included in an encryption circuit, be located inside an S-box that performs a threshold implementation operation that divides and calculates bits of an input signal into bits equal to or greater than the number of bits of the input signal, and synchronize the plurality of processes based on an enable signal.

Here, the input signal may be at least some of the signals calculated in the S-box, and the enable signal may be provided through the enable signal generator 120 to be described later.

In more detail, the synchronization unit 110 may receive an enable signal En through the enable signal generator 120 to be described later and synchronize signals used in a threshold implementation operation process performing in the S-box.

That is, the synchronization unit 110 may synchronize signals used in a threshold implementation operation process performing in the S-box based on the enable signal supplied from the enable signal generator 120.

Hereinafter, an embodiment of the synchronization unit 110 will be described in detail with reference to FIGS. 2 and 3.

Figure 2:
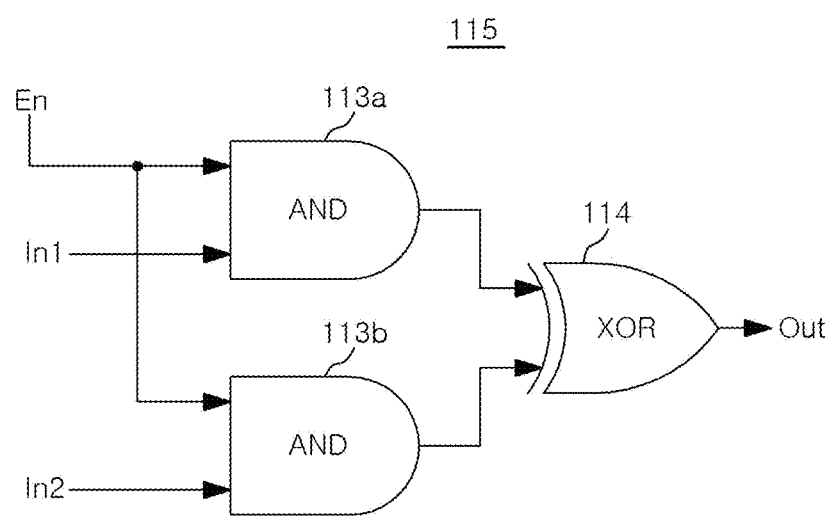
FIG. 2 represents a circuit diagram of a synchronization unit according to an embodiment of the present disclosure.

FIG. 2 represents a circuit diagram of a synchronization unit according to an embodiment of the present disclosure.

Referring to FIG. 2, the synchronization unit 110 may include a combination logic circuit unit 115, and there may be a plurality of combination logic circuit units 115.

The combinational logic circuit unit 115 may include a plurality of AND gates 113a and 113b and a first XOR gate 114.

The plurality of AND gates 113a and 113b may receive at least some signals In1 and In2 among signals calculated in the S-box and an enable signal En to perform an AND operation of the signals and output.

In this case, the plurality of AND gates may receive an enable signal En from the enable signal generator 120 to be described later, but the present disclosure is not limited thereto.

The first XOR gate 114 may receive a signal output from each of the plurality of AND gates 113a and 113b to perform an XOR operation of the signals and output.

For example, the first XOR gate 114 may receive a signal output from the AND gate 113a and a signal output from the AND gate 113b to perform an XOR operation of the signals and output.

Figure 3A:
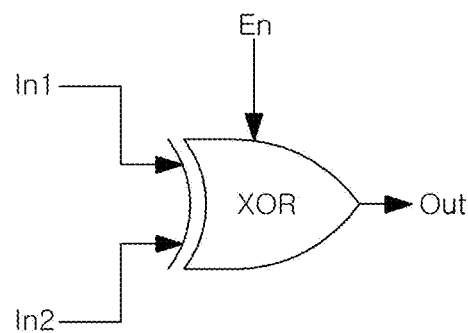
FIGS. 3A and 3B represent a circuit diagram of a synchronization unit according to another embodiment of the present disclosure.
Figure 3B:
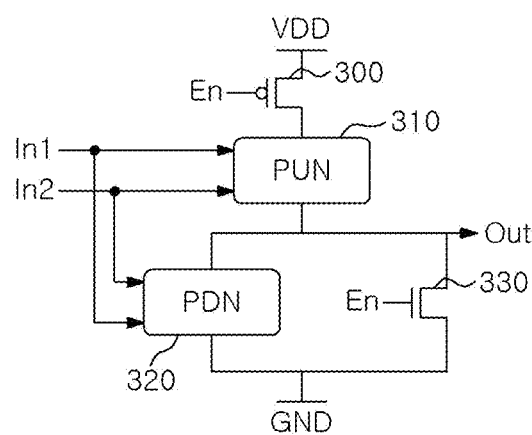

FIGS. 3A and 3B represent a circuit diagram of a synchronization unit according to another embodiment of the present disclosure.

Referring to FIG. 3A, the synchronization unit 110 does not include an AND gate and may receive input signals (In1, In2, e.g., at least some of the signals calculated in the S-box) and enable signals En to perform an XOR operation of the signals and output.

That is, the XOR gate illustrated in FIG. 3A may receive at least some signals In1 and In2 and enable signals En among signals calculated in the S-box to perform an XOR operation of the signals and output.

Referring to FIG. 3B, the synchronization unit 110 illustrated in FIG. 3B may include a first switch element 300, a pull-up network (PUN) 310, a pull-down network (PDN) 320, and a second switch element 330.

For example, the circuit of FIG. 3B may be implemented by adding the first switch element 300 and the second switch element 330 in a complementary metal-oxide-semiconductor (CMOS)-based structure of an encryption circuit.

The synchronization unit 110 illustrated in FIG. 3B may be used instead of a standard cell used for implementing an encryption algorithm, but the present disclosure is not limited thereto.

The first switch element 300 may receive the enable signal En to be selectively switched.

The PUN 310 may be connected in series with the first switch element 300 and receive input signals (In1, In2, e.g., at least some of the signals calculated in the S-box).

The PDN 320 may be connected in series with the PUN 310, and receive input signals (In1, In2, e.g., at least some of the signals calculated in the S-box).

Here, the signals provided by the PUN 310 and the PDN 320 may be the same signal.

The second switch element 330 may be connected in series with the PUN 310, connected in parallel with the PDN 320, and receive the enable signal En to be selectively switched.

For example, the first switch element 300 and the second switch element 330 are switching elements in which a switch may be turned on or off, and may be implemented into a transistor.

The circuit diagram of FIG. 3B may receive an enable signal En and at least some signals In1 and In2 of the signals calculated in the S-box without a separate AND gate configuration to process the signals, as illustrated in FIG. 3A.

In more detail, in the circuit diagram of FIG. 3B, the first switch element 300 and the second switch element 330 receiving the enable signal are selectively switched to adjust the supply timing of the enable signal En, the enable signal is supplied at the appropriate timing, and at least some signals In1 and In2 of the signals calculated in the S-box may be synchronized and outputted based on the supplied enable signal.

In this way, because the synchronization unit 110 may be designed using a simple combinational logic circuit or switch element, fewer bits may be used for calculating compared with when implementing the synchronization unit 110 with a flip flop (FF), and an area, a power consumption amount, and a cost for implementing the synchronization unit 110 may be reduced.

Referring again to FIG. 1, the enable signal generator 120 may be provided to generate an enable signal and supply the enable signal to the synchronization unit 110.

The enable signal generator 120 may include a flip-flop 123, a first critical path replica circuit (CPR1) 125, and a second critical path replica circuit (CPR2) 127.

The flip-flop 123 may receive a clock signal to be operated.

The CPR1 125 may be operated to receive an output signal of the flip-flop 123 and supply an enable signal en1 to some of the synchronization unit 110.

For example, the CPR1 125 may be operated to supply an enable signal en1 to some of a plurality of combination logic circuits of the synchronization unit 110.

The CPR2 127 may be connected in series with the CPR1 125, and the CPR1 125 may be operated to provide an enable signal en1 to a part 110-*a* of the synchronization units 110 and then supply an enable signal en2 to the part of the synchronization units 110 and another synchronization unit 110-*b*.

Further, the enable signal generator 120 may further include a plurality of critical path replica circuits CPR3, CPR4, CPR5 . . . connected in series with the CPR2 127.

For example, the CPR1 125 and the CPR2 127 may be implemented into a plurality of logic gates or inverter chains.

In this case, the CPR1 125 and the CPR2 127 may be variously designed according to a designer, for example, may be designed in the same circuit as that of the synchronization unit 110.

When the enable signal generator 120 supplies an enable signal to a part 110-*a* of the synchronization unit through the CPR1 125, the part 110-*a* of the synchronization unit synchronizes at least some of signals calculated in the S-box based on the received enable signal, and transfers the synchronized signal to the synchronization unit 110-*b* of the next section.

Here, the synchronization unit 110-*b* of the next section means the synchronization unit 110-*b* located close to the part 110-*a* of the synchronization unit received an enable signal through the CPR1 125 to receive a signal of the part 110-*a* of the synchronization unit.

In this case, the synchronization unit 110-*b* of the next section should receive an enable signal after all signals have reached gates of the part 110-*a* of the synchronization unit, but because the synchronization unit 110-*b* of the next section receives the enable signal after passing through the CPR2 127, the synchronization unit 110-*b* of the next section may receive the enable signal en2 at the appropriate timing.

The initialization circuit unit 130 may provide an initialization signal to the synchronization unit 110 that receives the enable signal, and the initialization circuit unit 130 may include a NOT gate 133, a second XOR gate 135, and a third XOR gate 137.

The NOT gate 133 may receive an output signal of the flip-flop 123 to perform a NOT operation of the signal and output.

The second XOR gate 135 may receive an output signal of the NOT gate 133 and an output signal of the CPR1 125 to perform an XOR operation of the signals, thereby outputting an enable signal en1.

The third XOR gate 137 may receive an output signal of the NOT gate 133 and an output signal of the CPR2 127 to perform an XOR operation of the signals, thereby outputting an enable signal en2.

Furthermore, the initialization circuit unit 130 may further include a plurality of XOR gates that receive an output signal of the NOT gate 133 and an output signal of the plurality of critical path replica circuits CPR3, CPR4, CPR5 . . . .

Hereinafter, an operation of the initialization circuit unit 130 will be described in detail with reference to FIG. 4.

Figure 4:
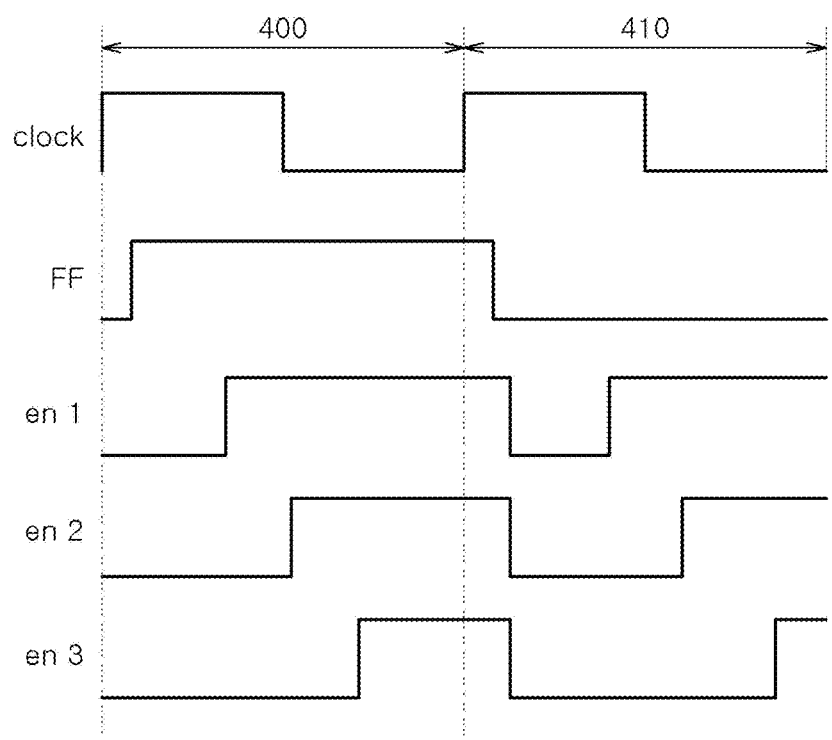
FIG. 4 shows a signal waveform for an initialization circuit unit according to an embodiment of the present disclosure.

FIG. 4 shows a signal waveform for an initialization circuit diagram according to an embodiment of the present disclosure.

Referring to FIG. 4, it can be seen that all of logic signals of enable signals en1, en2, and en3 are "1" and are output within one cycle of a clock signal.

More specifically, when the flip-flop FF receives a clock signal, the CPR1 125 that receives an output signal of the flip-flop FF outputs a signal, and when an output signal "1" of the flip-flop FF is input to the NOT gate 133, the second XOR gate 135 receives a NOT-operated signal "0" and a signal of the CPR1 125 to perform an XOR operation of the signals, thereby outputting an enable signal en1 "1".

Likewise, when the output signal "1" of the flip-flop FF is input to the NOT gate 133, the third XOR gate 137 receives a NOT-operated signal "0" and a signal of the CPR2 127 to perform an XOR operation of the signals, and output an enable signal en2 "1".

In this case, when the enable signals en1 and en2 "1" are output from the third XOR gate 137, each of the enable signals en1, en2, and en3 may be supplied to some of the synchronization unit 110.

After the enable signals en1, en2, and en3 are supplied within one clock cycle 400, the enable signals en1, en2, and en3 should be again initialized from "1" to "0" so that the enable signals en1, en2, and en3 are supplied even in the next clock cycle 410.

In this case, when the output signal "0" of the flip-flop FF is input to the NOT gate 133 in the next clock cycle 410, the initialization circuit unit 130 may receive a NOT-operated signal "1" and a signal of the CPR1 125 to initialize the enable signals en1, en2, and en3 while outputting the enable signals en1, en2, and en3 "0".

Therefore, the enable signals en1, en2, and en3 may be reset in the next clock cycle 410, and accordingly, after the enable signals en1, en2, and en3 are initialized, the enable signals may be again supplied to a part of the synchronization unit 110.

As described above, because the synchronization circuit according to an embodiment can synchronize signals used in a threshold implementation operation process performing in the S-box using a simple combinational logic circuit or switch element, an area, a power consumption amount, and a cost to implement the synchronization circuit can be relatively reduced.

Further, because the synchronization circuit can perform an operation that takes several clock cycles within one clock cycle, the latency of the operation can be greatly reduced.

Further, by using a synchronization circuit, a glitch phenomenon caused by a difference in delay of a signal that reaches the circuit can be eliminated.

The above description is merely illustrative of the technical idea of the present disclosure, and those of ordinary skill in the art to which the present disclosure pertains will be able to make various modifications and variations without departing from the essential quality of the present disclosure. Accordingly, the embodiments disclosed in the present disclosure are not intended to limit the technical idea of the present disclosure, but the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. A synchronization circuit comprising:
   an enable signal generator configured to generate an enable signal; and
   a synchronization unit included in an encryption circuit and located inside an S-box that performs a threshold implementation operation that calculates by dividing bits of an input signal into bits equal to or greater than the number of bits of the input signal, and configured to synchronize signals used in a threshold implementation operation process based on the generated enable signal,
   wherein the enable signal generator comprises:
   a flip-flop configured to receive a clock signal;
   a first critical path replica circuit configured to receive an output signal of the flip-flop and provide the enable signal to a part of the synchronization unit; and
   a second critical path replica circuit connected in series with the first critical path replica circuit and configured to provide the enable signal to a synchronization circuit different from a part of the synchronization circuit.

2. The synchronization circuit of claim 1, further comprising an initialization circuit configured to provide an initialization signal to the synchronization unit that receives the enable signal.

3. The synchronization circuit of claim 1, wherein the synchronization unit comprises:
   a plurality of AND gates configured to receive a part of the input signal and the enable signal; and
   a plurality of combinational logic circuit units comprising a first XOR gate configured to receive an output of each of the plurality of AND gates.

4. The synchronization circuit of claim 1, wherein the initialization circuit unit comprises:
   an NOT gate configured to receive an output signal of the flip-flop;
   a second XOR gate configured to receive an output signal of the NOT gate and an output signal of the first critical path replication circuit; and
   a third XOR gate configured to receive an output signal of the NOT gate and an output signal of the second critical path replica circuit.

5. The synchronization circuit of claim 1, wherein the synchronization unit comprises:
   a first switch element configured to receive the enable signal to be selectively switched;
   a pull-up network (PUN) connected in series with the first switch element and configured to receive the input signal;
   a pull-down network (PDN) connected in series with the PUN and configured to receive the input signal; and
   a second switch element connected in series with the PUN, connected in parallel with the PDN, and configured to receive the enable signal to be selectively switched.

* * * * *